(12) United States Patent
Wang et al.

(10) Patent No.: US 9,723,482 B2
(45) Date of Patent: Aug. 1, 2017

(54) ANTI-THEFT PROTECTION METHOD AND DEVICE FOR CELLULAR PHONE

(71) Applicant: TENCENT TECHNOLOGY (SHENZHEN) COMPANY LIMITED, Shenzhen (CN)

(72) Inventors: Qing Wang, Shenzhen (CN); Zhanghu Luo, Shenzhen (CN); Zefeng Huang, Shenzhen (CN); Haoran Guo, Shenzhen (CN); Quanhao Xiao, Shenzhen (CN); Yixia Yuan, Shenzhen (CN); Jiashun Song, Shenzhen (CN); Pengtao Li, Shenzhen (CN); Yunfeng Dai, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 163 days.

(21) Appl. No.: 14/332,718

(22) Filed: Jul. 16, 2014

(65) Prior Publication Data

US 2014/0329500 A1 Nov. 6, 2014

Related U.S. Application Data

(63) Continuation of application No. PCT/CN2013/070717, filed on Jan. 18, 2013.

(30) Foreign Application Priority Data

Jan. 19, 2012 (CN) .......................... 2012 1 0017606

(51) Int. Cl.
*H04M 1/66* (2006.01)
*H04M 1/68* (2006.01)
(Continued)

(52) U.S. Cl.
CPC ............ *H04W 12/06* (2013.01); *H04W 8/183* (2013.01); *H04W 12/12* (2013.01); *H04W 8/245* (2013.01)

(58) Field of Classification Search
CPC ........ H04W 12/12; H04W 88/02; H04M 1/66
(Continued)

(56) References Cited

U.S. PATENT DOCUMENTS 5,594,740 A * 1/1997 LaDue ................ G07C 9/00111
340/870.02
6,741,851 B1 5/2004 Lee et al.
(Continued)

FOREIGN PATENT DOCUMENTS

CN 1694548 A 11/2005
CN 1787583 A 6/2006
(Continued)

OTHER PUBLICATIONS

European Search Report for Application No. 13738538.1 dated Jul. 2, 2015.
(Continued)

*Primary Examiner* — Joseph Arevalo
(74) *Attorney, Agent, or Firm* — Harness, Dickey & Pierce, P.L.C.

(57) ABSTRACT

An anti-theft protection method and device for a cellular phone is provided. The method includes: judging whether the cellular phone satisfies a pre-set condition for starting an anti-theft mode, if so, starting the anti-theft mode; and transmitting anti-theft protection information to a designated contact to instruct the designated contact to perform anti-theft processing for the cellular phone. The device comprises a judgment module, a starting module, and a transmission module.

20 Claims, 3 Drawing Sheets

(51) Int. Cl.
*H04M 3/16* (2006.01)
*H04W 12/06* (2009.01)
*H04W 12/12* (2009.01)
*H04W 8/18* (2009.01)
*H04W 8/24* (2009.01)

(58) Field of Classification Search
USPC ....... 455/411, 410, 418, 346, 466, 558, 551, 455/552.1
See application file for complete search history.

(56) References Cited

U.S. PATENT DOCUMENTS

| | | | | |
|---|---|---|---|---|
| 8,566,610 | B2* | 10/2013 | Hazra | G06F 21/88 380/28 |
| 8,730,334 | B2* | 5/2014 | Cooley | G06F 21/88 348/211.3 |
| 2006/0025177 | A1* | 2/2006 | Tu | H04M 1/66 455/558 |
| 2007/0082705 | A1* | 4/2007 | Jain | H04M 1/66 455/558 |
| 2008/0001740 | A1* | 1/2008 | Liu | G08B 13/1409 340/568.1 |
| 2008/0220744 | A1 | 9/2008 | Rydgren et al. | |
| 2009/0125442 | A1* | 5/2009 | Otto | G06Q 20/04 705/39 |
| 2009/0270126 | A1 | 10/2009 | Liu | |
| 2010/0210240 | A1 | 8/2010 | Mahaffey et al. | |
| 2010/0216429 | A1* | 8/2010 | Mahajan | G06F 21/6245 455/411 |
| 2011/0149078 | A1* | 6/2011 | Fan | G08B 13/19669 348/152 |
| 2012/0209670 | A1* | 8/2012 | Zealer | G06Q 30/02 705/14.1 |
| 2013/0260719 | A1* | 10/2013 | Miyaki | H04W 12/08 455/411 |
| 2016/0323742 | A1* | 11/2016 | Huang | H04W 12/12 |

FOREIGN PATENT DOCUMENTS

| | | |
|---|---|---|
| CN | 1859670 A | 11/2006 |
| CN | 1946230 A | 4/2007 |
| CN | 101039346 A | 9/2007 |
| CN | 101287211 A | 10/2008 |
| EP | 1170969 A1 | 1/2002 |
| EP | 1874069 A1 | 1/2008 |
| JP | 07193865 A | 7/1995 |
| JP | 2002-077372 A | 3/2002 |
| JP | 2004140710 A | 5/2004 |
| JP | 2006129329 A | 5/2006 |
| JP | 2006261990 A | 9/2006 |
| JP | 2010-110005 A | 5/2010 |

OTHER PUBLICATIONS

Chinese Office Action for Application No. 2012100176067 dated Feb. 5, 2015, and an English concise explanation of relevance thereof.
International Preliminary Report for International Application No. PCT/CN2013/070717, dated Jul. 22, 2014.
Japanese Office Action for Application No. 2014-552502 dated Jul. 6, 2015, and its English translation thereof.
International Search Report for Application No. PCT/CN2013/070717 dated Apr. 25, 2013, and its English translation thereof.

* cited by examiner

ANTI-THEFT PROTECTION METHOD AND DEVICE FOR CELLULAR PHONE

CROSS-REFERENCE TO RELATED APPLICATIONS

This application is a continuation of International Application No. PCT/CN2013/070717, filed on Jan. 18, 2013, which claims the benefit and priority from Chinese Application No. 2012100176067, entitled "Anti-Theft Protection Method And Device For Cellular Phone" and filed on Jan. 19, 2012. The entire disclosures of each of the above applications are incorporated herein by reference.

FIELD

The present disclosure relates to a field of information processing technology and to an anti-theft protection method and device for a cellular phone

BACKGROUND

This section provides background information related to the present disclosure which is not necessarily prior art.

With the ever increasing functions of the cellular phone, there is a close connection between the cellular phone and daily life. If a cellular phone is lost or stolen, it will cause a great deal of frustration to the user; for example, the user may have to to spend additional money to purchase a new cellular phone and take a significant amount of time and effort to recover the phone numbers and information of his contacts. The loss of a cellular phone may even result in a leakage of the user's private information.

The prior art provides an anti-theft protection method for the cellular phone when a user transmits an anti-theft protection instruction to the stolen cellular phone when realizing that the cellular phone has been stolen or lost, the stolen cellular phone then receives and executes the anti-theft protection instruction. A user can transmit the anti-theft protection instruction in the form of a short message to the lost cellular phone, for example, a short message with the content of "start the anti-theft mode", "display the mandatory information", or "delete the short messages" is transmitted to the lost cellular phone; accordingly, the stolen cellular phone performs actions of starting an anti-theft mode, displaying mandatory information, and deleting short messages.

SUMMARY

This section provides a general summary of the disclosure, and is not a comprehensive disclosure of its full scope or all of its features.

In one aspect, an embodiment of the present disclosure provides an anti-theft protection method for a cellular phone, the method includes:

judging whether the cellular phone satisfies a pre-set condition for starting an anti-theft mode on the condition that the cellular phone satisfies the condition, starting the anti-theft mode; and transmitting anti-theft protection information to a designated contact to instruct the designated contact to perform anti-theft processing for the cellular phone.

In another aspect, an embodiment of the present disclosure also provides an anti-theft protection device for a cellular phone. The device includes:

a judgment module, adapted for judging whether the cellular phone satisfies a pre-set condition for starting an anti-theft mode;

a starting module, adapted for starting the anti-theft mode on the condition that a judgment result of the judgment module is that the condition for starting the anti-theft mode is satisfied; and a transmission module, adapted for transmitting anti-theft protection information to a designated contact to instruct the designated contact to perform anti-theft processing for the cellular phone after the starting module starts the anti-theft mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In order to more clearly illustrate the technical solutions in the embodiments of the present invention, accompanying drawings needed to be used in the description of the embodiments will be briefly described below. The accompanying drawings described hereinafter are just some embodiments of the present disclosure, and to those of ordinary skill in the art, other accompanying drawings may also be obtained according to these accompanying drawings without inventive labors.

Corresponding reference numerals indicate corresponding parts throughout the several views of the drawings.

DETAILED DESCRIPTION

Example embodiments will now be described more fully with reference to the accompanying drawings.

To make the technical solutions and the advantages of the present invention more clear, the embodiments of the present invention will be further described in detail hereinafter in conjunction with the accompanying drawings.

Figure 1:
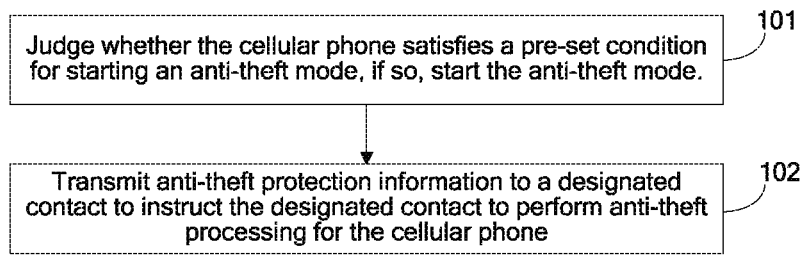
FIG. 1 is a flow chart of an anti-theft protection method for a cellular phone according to various embodiments.

According to various embodiments, an anti-theft protection method for a cellular phone is described in FIG. 1. The process of the method is as follows:

Block 101: judge whether the cellular phone satisfies a pre-set condition for starting an anti-theft mode, if the cellular phone satisfies the condition, start the anti-theft mode.

Block 102: transmit anti-theft protection information to a designated contact to instruct the designated contact to perform anti-theft processing for the cellular phone.

Here, the anti-theft protection information includes an anti-theft protection instruction and an instruction-transmission form and/or a web address. The website corresponding to the web address is used for saving the anti-theft protection instruction and the instruction-transmission form.

In the method provided by various embodiments, by transmitting the anti-theft protection information to a designated contact after starting the anti-theft mode to instruct the designated contact to perform the anti-theft processing for the cellular phone, the designated contact will not miss the anti-theft opportunity, which contributes to get back the stolen cellular phone and can effectively reduce the chance of leaking the user's private information.

Figure 2:
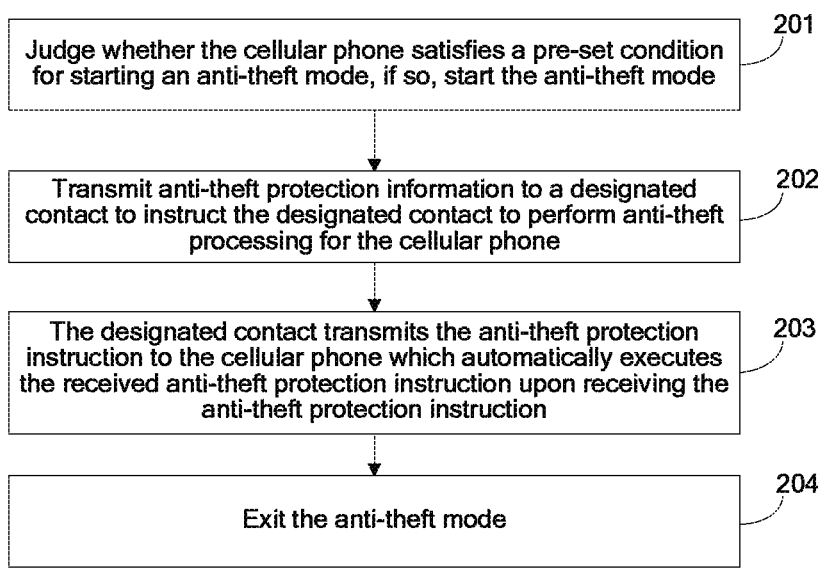
FIG. 2 is a flow chart of an anti-theft protection method for a cellular phone according to various embodiments.

According to various embodiments, an anti-theft protection method for a cellular phone is described in FIG. 2. The process of the method provided by this embodiment is specifically as follows:

Block 201: judge whether the cellular phone satisfies a pre-set condition for starting an anti-theft mode, if the cellular phone satisfies the condition, start the anti-theft mode.

In this step, before starting the anti-theft mode, it is necessary to judge whether to start the anti-theft mode according to the pre-set condition for starting the anti-theft mode. The embodiment of the present invention may adopt the following two methods to judge whether to start the anti-theft mode, which is not indented to limit of the disclosure.

In the first method, it is judged whether the current user data matches the pre-stored user data. If the current user data matches the pre-stored user data, then a normal mode is started. If the current user data does not match the pre-stored user data, then the user is prompted to input an anti-theft instruction, and it is judged whether the current user is legal in accordance with the anti-theft instruction currently inputted by the user. If the user is legal, then the normal mode is started, and if the user is illegal, i.e., the condition for starting anti-theft mode is satisfied, then the anti-theft mode is started.

Herein, the user data and the anti-theft instruction are set and saved in the cellular phone in advance by the original owner of the cellular phone. The user data may be identification numbers of the cellular phone, including data identifying the user's identity such as a cellular phone number, a SIM (Subscriber Identity Module) card number or a UIM (User Identity Module) card number, an IMSI (International Mobile Subscriber Identification Number), and the like. Of course, the user can also set other user data.

More specifically, when the cellular phone is powered on, the cellular phone number in the SIM or UIM card saved in the cellular phone are read out, and it is determined whether the cellular phone number in the SIM or UIM card is consistent with the cellular phone number saved in the cellular phone. If the cellular phone number in the SIM or UIM card is consistent with the cellular phone number saved in the cellular phone, the normal mode is started, and if the cellular phone number in the SIM or UIM card is inconsistent with the cellular phone number saved in the cellular phone, the cellular phone is locked and prompts the user to input an anti-theft password. The anti-theft password currently input by the user is obtained and it is judged whether the anti-theft password input by the user is the same as the anti-theft password saved in the cellular phone. If the anti-theft password input by the user is the same as the anti-theft password saved in the cellular phone, then the normal mode is started, if either the anti-theft password input by the user within either a predetermined time period or a predetermined number of times of inputs is different from the anti-theft password saved in the cellular phone, then the anti-theft mode is started.

In the second method, it is judged whether a remote instruction for starting the anti-theft mode has been received. If the remote instruction for starting the anti-theft mode has been received, then the condition for starting the anti-theft mode is satisfied, and the anti-theft mode is started in accordance with the received remote instruction for starting an anti-theft mode.

More specifically, when realizing that the cellular phone has been stolen or lost, the user initially transmits a remote instruction for starting the anti-theft mode to the stolen cellular phone. Accordingly, if the stolen cellular phone receives the remote instruction for starting the anti-theft mode, then the condition for starting anti-theft mode is satisfied, and the anti-theft mode is started in accordance with the remote instruction for starting the anti-theft mode.

More specifically, the user transmits the remote instruction for starting the anti-theft mode to the stolen cellular phone in a form of a short message. For example, the short message, the content of which is, "xxxx starts the anti-theft mode," is transmitted to the stolen cellular phone. "xxxx" represents an anti-theft password. The anti-theft mode is started when the stolen cellular phone receives the short message, the content of which is, "xxxx starts the anti-theft mode".

Herein, the process of starting the anti-theft mode in this step specifically includes performing a locking operation for the cellular phone, so that the current user of the cellular phone is unable to operate the cellular phone. Further, after starting the anti-theft mode, the method further includes executing a pre-set anti-theft protection instruction.

More specifically, the pre-set anti-theft protection instruction includes at least one of an instruction for forcedly displaying a built-in content, an instruction for forcedly displaying a remote built-in content, an instruction for uploading user location information, an instruction for replacing SIM card to send a short message to a port, an instruction for automatically accepting an incoming call, and an instruction for automatically shooting through a front camera and an instruction for deleting/backing up designated data, which is not intended to limit the present invention. For example, the original owner of the cellular phone pre-sets an instruction for forcedly displaying a built-in content and sets the content to be displayed forcedly, and accordingly, the instruction for forcedly displaying a built-in content is executed, such as the content to be displayed forcedly is displayed on the screen of the locked cellular phone.

Block 202: transmit anti-theft protection information to a designated contact to instruct the designated contact to perform anti-theft processing for the cellular phone.

Herein, the anti-theft protection information is used for enabling the designated contact to transmit an anti-theft protection instruction to the stolen cellular phone in accordance with the anti-theft protection information, which specifically includes an anti-theft protection instruction and an instruction-transmission form and/or a web address and the like, where the website corresponding to the web address is used for saving the anti-theft protection instruction and the instruction-transmission form, the web address is pre-stored in the cellular phone by the original owner of the cellular phone or is automatically saved in the cellular phone during installation of an anti-theft protection software. Here, the anti-theft protection instruction and the instruction-transmission form can enable the designated contact to transmit the anti-theft protection instruction to the stolen cellular phone in the instruction-transmission form. The anti-theft protection information can also include other information, such as specific descriptions of various anti-theft protection instructions, a login account number and password of the website corresponding to the web address, the current cellular phone number as well as information pre-set by the user such as the anti-theft protection instruction and specific parameters or the designated contact, etc. Here, the designated contact may be one or more contacts, such as the original owner of the stolen cellular phone or other contacts, and the contact may correspond to a variety of contact addresses including a cellular phone number and/or an email etc. Accordingly, the stolen cellular phone transmits the anti-theft protection information to the cellular phone number and/or the email corresponding to the designated contact.

Further, the anti-theft protection instruction includes one or more instructions for forcedly displaying a built-in content, a remote instruction for forcedly displaying a built-in content, an instruction for uploading user location information, an instruction for replacing SIM card to send a short message to a port, an instruction for automatically accepting an incoming call, and an instruction for automatically shooting through a front camera and an instruction for deleting/backing up designated data, which is not intended to limit the present disclosure. The anti-theft protection instruction may also include other instructions.

Herein, the embodiment of the present disclosure is described through an example where the anti-theft protection information includes the anti-theft protection instruction and the instruction-transmission form. On the condition that the cellular phone locally saves an anti-theft protection instruction list and the instruction-transmission forms for various situations, the anti-theft protection instruction may be obtained from the locally-saved anti-theft protection instruction list, the instruction-transmission forms for various situations may be obtained simultaneously, and the anti-theft protection information is generated in accordance with the obtained anti-theft protection instruction and the instruction-transmission forms for various situations. Alternatively, the instruction-transmission form corresponding to the communication way currently available in the cellular phone is obtained from the instruction-transmission forms for various situations, and the anti-theft protection information is generated in accordance with the obtained anti-theft protection instruction and the instruction-transmission form corresponding to the communication way currently available in the cellular phone. Alternatively, the instruction-transmission form is generated in accordance with the communication way currently available by the cellular phone in combination with the instruction identifying means corresponding to the communication way, and the anti-theft protection information is generated in accordance with the obtained anti-theft protection instruction and the generated instruction-transmission form. More specifically, Table 1 is an anti-theft protection instruction list locally saved by the cellular phone; the list includes serial numbers of instructions, the anti-theft protection instructions, and the descriptions thereof. The anti-theft protection instruction list may also include other information, such as the instruction-transmission forms for various situations, and the like.

TABLE 1

| Serial number | Instruction name | Description |
| --- | --- | --- |
| 1 | forcedly displaying a built-in content | For controlling the cellular phone to display designated information |
| 2 | forcedly displaying a remote content | For controlling the cellular phone to display the information transmitted by a designated information transmission end |
| 3 | instruction for uploading user location information | For controlling the cellular phone to transmit location information to a designated location information receiving end |
| 4 | replacing a SIM card to send a short message to a port | For controlling the cellular phone to transmit the cellular phone number of the current user to a designated number information receiving end |
| 5 | automatically accepting an incoming call | For controlling the cellular phone to answer all calls |
| 6 | automatically shooting through a front camera | For controlling the cellular phone to transmit the camera information of the current user to a designated camera information receiving end |
| 7 | deleting/backing up designated data | For controlling the cellular phone to delete the designated data or to transmit the designated data to a designated server |

Further, the various embodiments of the present disclosure are described through an example where the instruction-transmission form is generated in accordance with the communication way currently available in the cellular phone in combination with the instruction identifying means corresponding to the communication way. More specifically, query the communication way currently available in the cellular phone and generate the instruction-transmission form in accordance with the communication way currently available in the cellular phone in combination with the instruction identifying means corresponding to the communication way. For example, on the condition that the cellular phone communicates in a short message form, then the cellular phone may randomly generate an authentication code which is then saved locally, and the anti-theft protection instruction, the authentication code, the current cellular phone number, and the usage instruction of the authentication code are together transmitted to the designated contact in the form of a short message. For example, after the cellular phone starts the anti-theft mode, it is queried that a wireless communication way is available (for example, it is capable of transmitting/receiving short messages). A generated content is: 1. forcedly displaying a built-in content, 2. forcedly displaying a remote content, 3. uploading user location information, 4. replacing a SIM card to send a short message to a port, 5. automatically accepting an incoming call, 6. automatically shooting through a front camera, 7. deleting/backing up designated data. The authentication code is: "xxx, please transmit the authentication code+instruction or digital number+instruction or digital number+ . . . to the number 123456789". Herein, the front portion of the content of the short message is the anti-theft protection instructions, and the rear portion of this content is the instruction-transmission form.

After the anti-theft protection information is generated, the anti-theft protection information is transmitted to the designated contact by one or more of the current communication ways. If the wireless channel is available, then the anti-theft protection information is transmitted to the designated contact in the form of a short message, such as to the designated cellular phone number. If the data channel is available, such as a Wi-Fi hotspot is detected, the anti-theft protection information is transmitted to the designated contact in the form of an email. If there are multiple communication ways available, it is possible to try to transmit the anti-theft protection information to the designated contact by each available communication way in turn to ensure that the user can quickly receive the anti-theft protection information in order to control the stolen cellular phone in time. Herein, in addition to immediately transmitting the anti-theft protection information to the designated contact after starting the anti-theft mode, in the embodiment of the present disclosure, the anti-theft protection information may be transmitted to the designated contact at a predetermined time or at predetermined time intervals to ensure that the user can receive the anti-theft protection information.

In this step, by transmitting the anti-theft protection information to the designated contact where the anti-theft protection information includes an anti-theft protection instruction and an instruction-transmission form and/or a web address etc., the designated contact is able to transmit the anti-theft protection instruction in the instruction-transmission form, so that it is not necessary to remember relatively complicated anti-theft protection instructions, and it is convenient to operate, while enhancing the user experience.

Block 203: the designated contact transmits the anti-theft protection instruction to the cellular phone, and the cellular phone automatically executes the received anti-theft protection instruction upon receiving the anti-theft protection instruction.

More specifically, the anti-theft protection instructions may be transmitted by a user in various forms, such as the anti-theft protection instruction transmitted in a form of a short message, the instruction transmitted in a form of an email, and the like. After starting the anti-theft mode, all outward-facing communication rights such as the cellular phone's short messages, call, data network, and the like may also be obtained, so that the thief is unable to use the cellular phone and it is be ensured that the stolen cellular phone is able to receive the anti-theft protection instruction transmitted by the user.

Preferably, the anti-theft protection instruction may be transmitted over the Internet, providing a terminal user with a web page for logging in a server. The terminal user is able to query user data which is for identifying the user's identity, such as the cellular phone number, the SIM card number or UIM card number, IMSI, IMEI (International Mobile Equipment Identity) and the like recorded in the server through the web page or the cellular phone's operating state corresponding to the user data. The anti-theft protection instruction is transmitted to the cellular phone indicated by the user data in accordance with the user data. The anti-theft protection instruction may be the edited anti-theft protection instructions stored on a web page, so that the user does not need to edit when transmitting the instruction to the lost cellular phone, but simply select the anti-theft protection instruction needed to be transmitted directly. Herein, the anti-theft protection instruction include any one or more of the following instructions: an instruction for deleting the data in the cellular phone, an instruction for locking the cellular phone, an instruction for positioning the cellular phone and an instruction for recovering the cellular phone password. Of course, the anti-theft protection instruction may also be edited in real time by the user in accordance with the user data.

More specifically, in this step, upon finding that the cellular phone is lost, the cellular phone's user logs in the server through a personal account number, and checks the operating state of the cellular phone previously bound with the IMEI number to determine whether the cellular phone has been inserted with a new SIM number in accordance with the operating state of the cellular phone, and checks the current SIM number of the lost cellular phone obtained at the server's side. If the user finds that the operating state of the cellular phone has been lost, the user operates on the web page to select the anti-theft protection instruction to be transmitted, inputs the current SIM number of the lost cellular phone to generate the anti-theft protection instruction to be transmitted to the current SIM number of the cellular phone, and triggers the server to transmit the anti-theft protection instruction to the cellular phone so that the cellular phone can perform a corresponding operation in accordance with the anti-theft protection instruction. Preferably, the anti-theft protection instruction in this embodiment is sent to the lost cellular phone in the form of a short message.

In this step, if the anti-theft protection information includes the anti-theft protection instruction and the instruction-transmission form, then the designated contact may transmit the anti-theft protection instruction in the instruction-transmission form to the stolen cellular phone based on the anti-theft protection information. Accordingly, when receiving the anti-theft protection instruction, the stolen cellular phone automatically executes the received anti-theft protection instruction. If the anti-theft protection information includes the aforementioned web address, then the designated contact may transmit the anti-theft protection instruction in the instruction-transmission form saved in the website corresponding to the web address to the stolen cellular phone, and accordingly, when receiving the anti-theft protection instruction, the stolen cellular phone automatically executes the received anti-theft protection instruction.

More specifically, after receiving the anti-theft protection information in the form of a short message or email etc., the designated contact may obtain the anti-theft protection instruction and the instruction-transmission form in accordance with the content of the anti-theft protection information or in accordance with the website corresponding to the web address in the anti-theft protection information. The anti-theft protection instruction is then transmitted in the instruction-transmission form in the anti-theft protection information.

More specifically, if the designated contact receives a short message containing the anti-theft protection information, in accordance with the content of the short message, the designated contact may transmit the anti-theft protection instruction to the stolen cellular phone through the current cellular phone or another cellular phone in the instruction-transmission form in the anti-theft protection information. For example, upon receipt of the short message in Block 202, the designated contact instructs the cellular phone to execute the instruction for forcedly displaying a built-in content, the instruction for forcedly displaying a remote content and the instruction for deleting/backing up designated data, then the designated contact may transmit or directly reply a short message with a content of "xxx+1+2+7" to the cellular phone number of 123456789." Of course, the designated contact may also transmit or directly send a short message with the content of "xxx+forcedly displaying a built-in content+forcedly displaying a remote content+deleting/backing up designated data" to the cellular phone number of 123456789, where "xxx" is an authentication code.

In this step, since the anti-theft protection information includes the anti-theft protection instruction and the instruction-transmission form, as long as the designated contact transmits the anti-theft protection instruction in the instruction-transmission form according to the anti-theft protection information, then the stolen cellular phone is able to receive and identify the anti-theft protection instruction transmitted by the designated contact and execute the received anti-theft protection instruction. For example, the short message with a content "xxx+forcedly displaying a built-in content+forcedly displaying a remote content+deleting/backing up designated data" is received, the content of the short message is identified, and it is judged whether the content of the short message begins with a designated authentication code. If it does begin with the authentication code, the content of the short message is parsed so that the instruction in the short message can be obtained and executed, i.e., the instruction for forcedly displaying a built-in content, the instruction for forcedly displaying a remote content and the instruction for deleting/backing up designated data are executed, where "xxx" is an authentication code.

The specific execution process of each anti-theft protection instruction will be described hereinafter corresponding to the various anti-theft protection instructions in Block 202.

Figure 3:
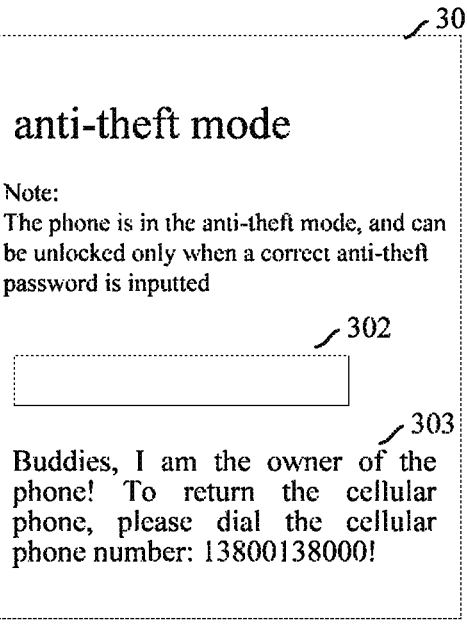
FIG. 3 is a diagram of a screen that forcedly displays a built-in content according to various embodiments.

More specifically, if the instruction for forcedly displaying a built-in content is received, the pre-set designated information is displayed on the screen, for example, the message, the user's contact address may be displayed and the content to be forcedly displayed may be configured in accordance with the user's requirements. As shown in FIG. 3, an anti-theft password input box 302 and the designated information 303 are displayed on a locked screen 301 of the cellular phone. The designated information 303 is, "Buddies, I am the owner of the phone! To return the cellular phone, please dial the cellular phone number: 13800138000!".

Figure 4:
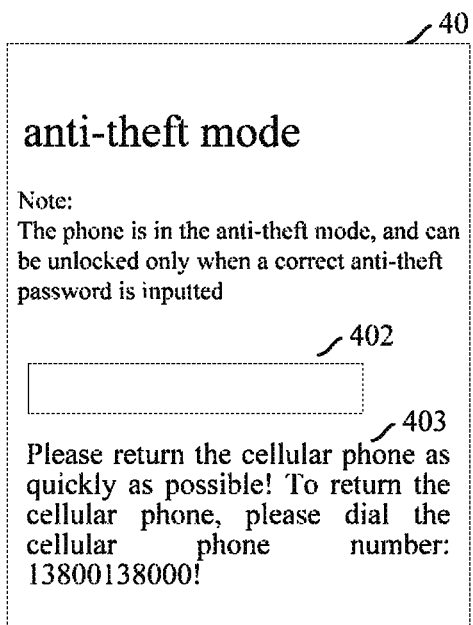
FIG. 4 is a diagram of a screen that forcedly displays a remote content according to various embodiments.

More specifically, if the instruction for forcedly displaying a remote content is received, the text, the short message, and the like transmitted from the designated information transmission end are received, and the content is forced to be displayed on the screen of the cellular phone. As shown in FIG. 4, an anti-theft password input box 402 and the information 403 transmitted by the designated information transmission end are displayed on a locked screen 401 of the cellular phone, the information 403 is, "Please return the cellular phone as quickly as possible! To return the cellular phone, please dial the cellular phone number: 13800138000!", where the designated information transmission end may be pre-designated or be designated by the corresponding instruction or be a designated contact or be a transmission end of the current instruction or the like.

More specifically, if the instruction for uploading user location information is received, the current position information is obtained, and the location information is transmitted to the designated location information receiving end, where the current position information may be obtained by invoking a GPS software or GPS module in local, or the location information such as the identifier of a Wi-Fi hotspot or a base station may be obtained by an API of the cellular phone. Here, the designated location information receiving end may be pre-designated, may be designated by the corresponding instruction, may be a designated contact, or may be a transmission end of the current instruction or the like.

More specifically, if the instruction for replacing a SIM card to send a short message to a port is received, it is detected whether the SIM or UIM card of the cellular phone is replaced. If it is replaced, then the cellular phone number corresponding to the current SIM or UIM card is obtained, the obtained cellular phone number is transmitted to the designated number information receiving end, wherein the designated number information receiving end may be pre-designated, may be designated by the corresponding instruction, may be a designated contact, or may be a transmission end of the current instruction or the like. Accordingly, the information of the current user of the cellular phone can be queried from the operator through this cellular phone number.

More specifically, if the instruction for automatically accepting an incoming call is received, all the incoming calls are connected, and the speaker is started. It is then capable of requiring the current user of the cellular phone to return the cellular phone by a call and telling him the way of returning the cellular phone.

More specifically, if the instruction for automatically shooting through a front camera is received, it is detected whether there is a front camera. If there is a front camera, it is opened to obtain camera information such as the picture of the current user's face, and the camera information obtained by shooting is transmitted to the designated camera information receiving end. Preferably, if there is no front camera, surrounding environment information may be obtained by controlling a non-front camera. Here, the designated camera information receiving end may be pre-designated, may be designated by the corresponding instruction, may be a designated contact, may be a transmission end of the current instruction, or the like. Of course, the user may also set a predetermined time and a predetermined time interval for shooting pictures, so that the stolen cellular phone can be retrieved through the camera information.

More specifically, if the instruction for deleting/backing up designated data is received, the designated data is deleted and/or the designated data is transmitted to the designated server for backup. For example, address book data and short message data is deleted, the address book data is transmitted to the designated server, where the content needed to be backed up and the designated server may be pre-designated or be designated by the corresponding instruction.

If a plurality of anti-theft protection instructions are received, then the plurality of anti-theft protection instructions are executed in turn.

Herein, in the embodiment of the present disclosure, the web address in the anti-theft protection information in Block 202 may also include a web address for controlling the website of the cellular phone and, accordingly, the user may log into a corresponding website to achieve the control of the cellular phone. For example, in Block 203, the stolen cellular phone can receive the anti-theft protection instruction transmitted by the specified website and execute the received anti-theft protection instruction.

Block 204: exit the anti-theft mode.

More specifically, it is possible to exit the anti-theft mode through the following two ways.

The first way: obtain an unlocking instruction input by the current user, judge whether the unlocking instruction input by the current user is correct, if it is correct, then exit the anti-theft mode, if it is incorrect, keep in the anti-theft mode. More specifically, prompt the user to input an unlocking instruction after the cellular phone starts the anti-theft mode, obtain the unlocking instruction input upon the current user catching the prompt, and judge whether the unlocking instruction input by the current user is the same as the unlocking instruction saved in the cellular phone, if it is the same, exit the anti-theft mode, otherwise, keep in the anti-theft mode.

The second way: receive a remote unlocking instruction and exit the anti-theft mode in accordance with the received remote unlocking instruction. For example, when the short message with the content of "xxxx exits the anti-theft mode" is received, exit the anti-theft mode, where "xxxx" represents an anti-theft password.

Herein, after exiting the anti-theft mode, the user data may be updated or the user is asked to reset the user data. For example, the user data is a cellular phone number, the pre-set cellular phone number is then updated to the current cellular phone number.

In the method provided by this embodiment, by transmitting the anti-theft protection information to a designated contact after starting the anti-theft mode to instruct the designated contact to perform the anti-theft processing for the cellular phone, the designated contact will not miss the anti-theft opportunity, which contributes to the retrieval of the stolen cellular phone and can effectively reduce the chance of leaking the user's private information.

Figure 5:
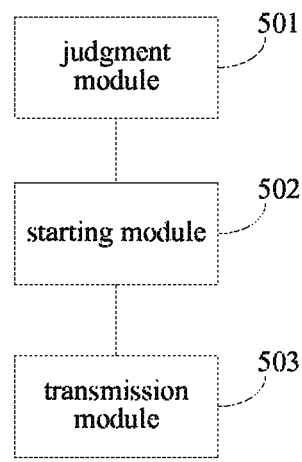
FIG. 5 is a block structural diagram of an anti-theft protection device for a cellular phone according to various embodiments.

According to various embodiments, an anti-theft protection device for a cellular phone is used for performing the anti-theft protection method for the cellular phone of the above-described various embodiments, such as with respect to FIG. 1. Referring to FIG. 5, the anti-theft protection device for a cellular phone includes the following:

A judgment module 401, adapted for judging whether the cellular phone satisfies a pre-set condition for starting an anti-theft mode;

A starting module 402, adapted for starting the anti-theft mode on the condition that a judgment result of the judgment module 401 is that the condition for starting the anti-theft mode is satisfied; and A transmission module 403, adapted for transmitting anti-theft protection information to a designated contact to instruct the designated contact to perform anti-theft processing for the cellular phone after the starting module 402 starts the anti-theft mode.

In the device provided by this embodiment, by transmitting the anti-theft protection information to a designated contact after starting the anti-theft mode to instruct the designated contact to perform the anti-theft processing for the cellular phone, the designated contact will not miss the anti-theft opportunity, which contributes to the retrieval of the stolen cellular phone and can effectively reduce the chance of leaking the user's private information.

Figure 6:
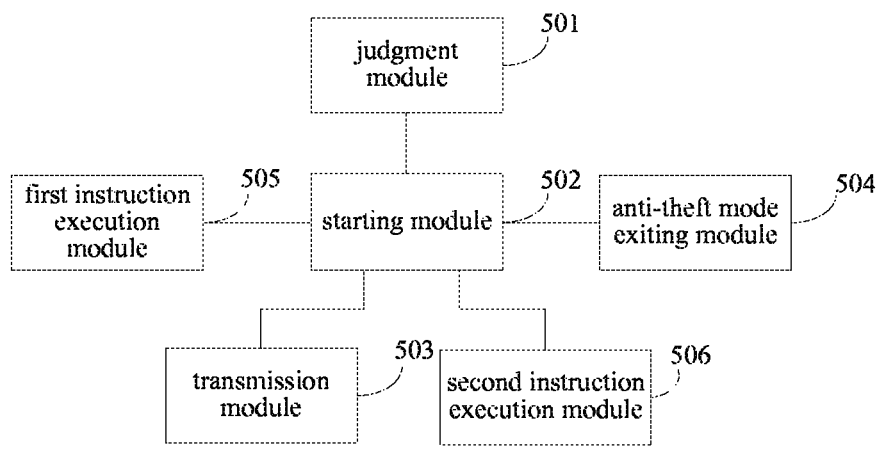
FIG. 6 is a block structural diagram of an anti-theft protection device for a cellular phone according to various embodiments.

According to various embodiments, an anti-theft protection device for a cellular phone is used for performing the anti-theft protection method for the cellular phone of the above-described various embodiments, such as with respect to FIG. 2. Referring to FIG. 6, the anti-theft protection device for a cellular phone includes the following:

A judgment module 501, adapted for judging whether the cellular phone satisfies a pre-set condition for starting an anti-theft mode;

A starting module 502, adapted for starting the anti-theft mode on the condition that a judgment result of the judgment module 501 is that the condition for starting the anti-theft mode is satisfied; and A transmission module 503, adapted for transmitting anti-theft protection information to a designated contact to instruct the designated contact to perform anti-theft processing for the cellular phone after the starting module 502 starts the anti-theft mode.

Herein, the judgment module 501 specifically includes the following:

A first judgment unit, adapted for judging whether the current user data matches pre-stored user data;

A prompting unit, adapted for prompting a user to input an anti-theft instruction on the condition that a judgment result of the first judgment unit is that the current user data does not match the pre-stored user data;

A second judgment unit, adapted for judging whether the user is legal according to the anti-theft instruction currently input by the user, and determining that the condition for starting the anti-theft mode is satisfied on the condition that the user is illegal; and A third judgment unit, adapted for judging whether a remote instruction for starting an anti-theft mode has been received, and determining that the condition for starting the anti-theft mode is satisfied on the condition that the remote instruction for starting an anti-theft mode has been received.

Herein, the starting module 502 is specifically adapted for performing a locking operation on the cellular phone to make the current user of the cellular phone unable to operate the cellular phone on the condition that a judgment result of the judgment module 501 is that the condition for starting anti-theft mode is satisfied.

Herein, the device further includes an anti-theft mode exiting module 504 which is adapted for, after the starting module 502 starts the anti-theft mode, obtaining an unlocking instruction inputted by the current user, judging whether the unlock instruction is correct, and exiting the anti-theft mode on the condition that the unlocking instruction is correct; or is adapted for, after the starting module 502 starts the anti-theft mode, receiving a remote unlocking instruction, and exiting the anti-theft mode in accordance with the remote unlocking instruction.

Herein, the device further includes a first instruction execution module 505 which is adapted for executing a pre-set anti-theft protection instruction after the starting module 502 starts the anti-theft mode.

Here, the anti-theft protection information includes an anti-theft protection instruction and an instruction-transmission form. The device further includes a second instruction execution module 506 which is adapted for, after the designated contact transmitting the anti-theft protection instruction to the cellular phone in the instruction-transmission form based on the anti-theft protection information, receiving the anti-theft protection instruction and automatically executing the received anti-theft protection instruction.

Alternatively, the anti-theft protection information includes a web address. The website corresponding to the web address is used for saving the anti-theft protection instruction and the instruction-transmission form, and the device further includes a second instruction execution module 506 which is adapted for, after the designated contact transmitting the anti-theft protection instruction to the cellular phone in the instruction-transmission form saved in the website corresponding to the web address, receiving the anti-theft protection instruction and automatically executing the received anti-theft protection instruction.

Herein, the anti-theft protection instruction specifically includes at least one of: an instruction for forcedly displaying a built-in content, an instruction for forcedly displaying a remote built-in content, an instruction for uploading user location information, an instruction for replacing SIM card to send a short message to a port, an instruction for automatically accepting an incoming call, an instruction for automatically shooting through a front camera, and an instruction for deleting/backing up designated data.

In the device provided by the various embodiments, by transmitting the anti-theft protection information to a designated contact after starting the anti-theft mode to instruct the designated contact to perform the anti-theft processing for the cellular phone, the designated contact will not miss the anti-theft opportunity, which contributes to get back the stolen cellular phone and can effectively reduce the chance of leaking the user's private information.

It should be noted that the anti-theft protection device for the cellular phone provided by the above-described embodiments is only exemplified by the division of the functional modules described above. In practical applications, the above functions may be allocated to different functional modules as demanded, i.e., the internal structure of the device is divided into different functional modules to complete all or part of the functions described above. In addition, the anti-theft protection device for the cellular phone provided in the embodiments has the same concept as the anti-theft protection method for the cellular phone provided in the embodiments. The specific implementation processes of the device can be found in the embodiments of the method, and will not be described in detail herein.

It can be understood by those of ordinary skill in the art that all or a part of the steps of the above-described embodiments can be accomplished by hardware and may also be accomplished by a program instructing the related hardware. The program may be stored in a computer-readable storage medium which may be a read-only memory, a magnetic disk, an optical disk, or etc.

The foregoing is only the embodiments of the present disclosure and is not intended to limit the present invention. Any modifications, substitutions, and improvements made within the spirit and the principle of the present disclosure are intended to be included within the protection scope of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. An anti-theft protection method for a cellular phone, wherein the method comprises:

judging, by a device in the cellular phone, whether the cellular phone satisfies a pre-set condition for starting an anti-theft mode, on the condition that the cellular phone satisfies the condition, starting, by the device in a cellular phone, the anti-theft mode;

transmitting, by the device in the cellular phone, anti-theft protection information to a designated contact to instruct the designated contact to perform anti-theft processing for the cellular phone; wherein the anti-theft protection information provides preconfigured operations to be selected by the designated contact to generate an anti-theft protection instruction and indicates an instruction-transmission form for sending the generated anti-theft protection instruction, wherein the anti-theft protection instruction includes at least one of a password input box and a contact number to be displayed on the device in the cellular phone;

receiving, by the device in the cellular phone, the anti-theft protection instruction generated by the designated contact by selecting the operations indicated by the anti-theft protection information and sent by the designated contact via the instruction-transmission form; and automatically executing, by the device in the cellular phone, the received anti-theft protection instruction.

2. The method according to claim 1, wherein a process of judging whether the cellular phone satisfies a pre-set condition for starting an anti-theft mode specifically comprises:

judging whether the current user data matches pre-stored user data, on the condition that the current user data does not match the pre-stored user data, prompting a user to input an anti-theft instruction, and judging whether the user is legal according to the anti-theft instruction currently inputted by the user, and determining that the condition for starting the anti-theft mode is satisfied on the condition that the user is illegal; or judging whether a remote instruction for starting an anti-theft mode has been received, and determining that the condition for starting the anti-theft mode is satisfied on the condition that the remote instruction for starting an anti-theft mode has been received.

3. The method according to claim 1, wherein a process of starting the anti-theft mode specifically comprises:

performing a locking operation on the cellular phone to make the current user of the cellular phone user unable to operate the cellular phone.

4. The method according to claim 3, wherein after the process of starting the anti-theft mode, the method further comprises:

obtaining an unlocking instruction inputted by the current user, judging whether the unlock instruction is correct, and exiting the anti-theft mode on the condition that the unlocking instruction is correct; or receiving a remote unlocking instruction, and exiting the anti-theft mode in accordance with the remote unlocking instruction.

5. The method according to claim 1, wherein after a process of starting the anti-theft mode, the method further comprises:
executing a pre-set anti-theft protection instruction.

6. The method according to claim 1, wherein the anti-theft protection information comprises the operations to be selected to generate the anti-theft protection instruction and the instruction-transmission form for sending the generated anti-theft protection instruction, and a process of the designated contact performing the anti-theft processing for the cellular phone specifically comprises:
the designated contact generating the anti-theft protection instruction by editing according to the operations selected from the anti-theft protection information, and transmitting through a device the anti-theft protection instruction to the cellular phone in the instruction-transmission form, and accordingly, upon receiving the anti-theft protection instruction, the cellular phone automatically executing the received anti-theft protection instruction.

7. The method according to claim 1, wherein the anti-theft protection information comprises a web address, the website corresponding to the web address is adapted for saving the operations to be selected to generate the anti-theft protection instruction and the instruction-transmission form for sending the generated anti-theft protection instruction, and a process of the designated contact performing the anti-theft processing for the cellular phone specifically comprises:
the designated contact generating the anti-theft protection instruction by selecting the operations from the website, and transmitting through a device the anti-theft protection instruction to the cellular phone in the instruction-transmission form, and accordingly, upon receiving the anti-theft protection instruction, the cellular phone automatically executing the received anti-theft protection instruction.

8. The method according to claim 5, wherein the anti-theft protection instruction specifically comprises at least one of:
an instruction for forcedly displaying a built-in content, an instruction for forcedly displaying a remote built-in content, an instruction for uploading user location information, an instruction for replacing SIM card to send a short message to a port, an instruction for automatically accepting an incoming call, an instruction for automatically shooting through a front camera and an instruction for deleting/backing up designated data.

9. A cellular phone, comprising:
an anti-theft device on the cellular phone including:
a judgment module, adapted for judging whether the cellular phone satisfies a pre-set condition for starting an anti-theft mode;
a starting module, adapted for starting the anti-theft mode on the condition that a judgment result of the judgment module is that the condition for starting the anti-theft mode is satisfied;
a transmission module, adapted for transmitting anti-theft protection information to a designated contact to instruct the designated contact to perform anti-theft processing for the cellular phone after the starting module starts the anti-theft mode; wherein the anti-theft protection information provides preconfigured operations to be selected by the designated contact to generate an anti-theft protection instruction and indicates an instruction-transmission form for sending the generated anti-theft protection instruction, wherein the anti-theft protection instruction includes at least one of a password input box and a contact number to be displayed on the device in the cellular phone; and
a module, adapted for receiving, by the device in the cellular phone, the anti-theft protection instruction generated by the designated contact by selecting the operations indicated by the anti-theft protection information and sent by the designated contact via the instruction-transmission form; and executing automatically, by the device in the cellular phone, the received anti-theft protection instruction.

10. The device according to claim 9, wherein the judgment module specifically comprises:
a first judgment unit, adapted for judging whether the current user data matches pre-stored user data;
a prompting unit, adapted for prompting a user to input an anti-theft instruction on the condition that a judgment result of the first judgment unit is that the current user data does not match the pre-stored user data;
a second judgment unit, adapted for judging whether the user is legal according to the anti-theft instruction currently inputted by the user, and determining that the condition for starting the anti-theft mode is satisfied on the condition that the user is illegal; and
a third judgment unit, adapted for judging whether a remote instruction for starting an anti-theft mode has been received, and determining that the condition for starting the anti-theft mode is satisfied on the condition that the remote instruction for starting an anti-theft mode has been received.

11. The device according to claim 9, wherein the starting module is specifically adapted for performing a locking operation on the cellular phone to make the current user of the cellular phone user unable to operate the cellular phone on the condition that a judgment result of the judgment module is that the condition for starting anti-theft mode is satisfied.

12. The device according to claim 11, wherein the device further comprises: an anti-theft mode exiting module, wherein
the anti-theft mode exiting module is adapted for, after the starting module starts the anti-theft mode, obtaining an unlocking instruction inputted by the current user, judging whether the unlock instruction is correct, and exiting the anti-theft mode on the condition that the unlocking instruction is correct; or is adapted for, after the starting module starts the anti-theft mode, receiving a remote unlocking instruction, and exiting the anti-theft mode in accordance with the remote unlocking instruction.

13. The device according to claim 9, wherein the device further comprises:
a first instruction execution module, adapted for executing a pre-set anti-theft protection instruction after the starting module starts the anti-theft mode.

14. The device according to claim 13, wherein the anti-theft protection instruction specifically comprises at least one of:
an instruction for forcedly displaying a built-in content, an instruction for forcedly displaying a remote built-in content, an instruction for uploading user location information, an instruction for replacing SIM card to send a short message to a port, an instruction for automatically accepting an incoming call, an instruction for automatically shooting through a front camera and an instruction for deleting/backing up designated data.

15. The device according to claim 9, wherein the anti-theft protection information comprises the operations to be selected to generate the anti-theft protection instruction and the instruction-transmission form for sending the generated anti-theft protection instruction, and the module comprises:
 a second instruction execution module, adapted for, after the designated contact transmitting the anti-theft protection instruction through a second device to the cellular phone in the instruction-transmission form, wherein the anti-theft protection instruction is generated by the designated contact by editing according to the operations selected from the anti-theft protection information; receiving the anti-theft protection instruction, and automatically executing the received anti-theft protection instruction.

16. The device according to claim 9, wherein the anti-theft protection information comprises a web address, the website corresponding to the web address is adapted for saving operations to be selected to generate the anti-theft protection instruction and the instruction-transmission form for sending the generated anti-theft protection instruction, the module comprises:
 a second instruction execution module, adapted for, after the designated contact transmitting the anti-theft protection instruction through a second device to the cellular phone in the instruction-transmission form, wherein the anti-theft protection instruction is generated by the designated contact by selecting the operations from the website; receiving the anti-theft protection instruction, and automatically executing the received anti-theft protection instruction.

17. A non-transitory computer-readable medium, having a set of instructions stored thereon, wherein when the set of instructions is executed, a computer is enabled to perform an anti-theft protection method for a cellular phone, comprising:
 judging whether the cellular phone satisfies a pre-set condition for starting an anti-theft mode, on the condition that the cellular phone satisfies the condition, starting the anti-theft mode;
 transmitting anti-theft protection information to a designated contact to instruct the designated contact to perform anti-theft processing for the cellular phone; wherein the anti-theft protection information provides preconfigured operations to be selected by the designated contact to generate an anti-theft protection instruction and indicates an instruction-transmission form for sending the generated anti-theft protection instruction, wherein the anti-theft protection instruction includes at least one of a password input box and a contact number to be displayed on the device in the cellular phone;
 receiving the anti-theft protection instruction generated by the designated contact by selecting the operations indicated by the anti-theft protection information and sent by the designated contact via the instruction-transmission form; and
 automatically executing the received anti-theft protection instruction.

18. The non-transitory computer-readable medium according to claim 17, wherein a process of judging whether the cellular phone satisfies a pre-set condition for starting an anti-theft mode specifically comprises:
 judging whether the current user data matches pre-stored user data, on the condition that the current user data does not match the pre-stored user data, prompting a user to input an anti-theft instruction, and judging whether the user is legal according to the anti-theft instruction currently inputted by the user, and determining that the condition for starting the anti-theft mode is satisfied on the condition that the user is illegal; or
 judging whether a remote instruction for starting an anti-theft mode has been received, and determining that the condition for starting the anti-theft mode is satisfied on the condition that the remote instruction for starting an anti-theft mode has been received.

19. The non-transitory computer-readable medium according to claim 17, wherein a process of starting the anti-theft mode specifically comprises:
 performing a locking operation on the cellular phone to make the current user of the cellular phone user unable to operate the cellular phone.

20. The non-transitory computer-readable medium according to claim 17, wherein
 on the condition that the anti-theft protection information comprises the operations to be selected to generate the anti-theft protection instruction and the instruction-transmission form for sending the generated anti-theft protection instruction, a process of the designated contact performing the anti-theft processing for the cellular phone specifically comprises: the designated contact generating the anti-theft protection instruction by editing according to the operations selected from the anti-theft protection information, and transmitting through a device the anti-theft protection instruction to the cellular phone in the instruction-transmission form, and accordingly, upon receiving the anti-theft protection instruction, the cellular phone automatically executing the received anti-theft protection instruction; or
 on the condition that the anti-theft protection information comprises a web address corresponding to the website adapted for saving operations to be selected to generate the anti-theft protection instruction and the instruction-transmission form for sending the generated anti-theft protection instruction, a process of the designated contact performing the anti-theft processing for the cellular phone specifically comprises: the designated contact generating the anti-theft protection instruction by selecting the operations from the website, and transmitting through a device the anti-theft protection instruction to the cellular phone in the instruction-transmission form, and accordingly, upon receiving the anti-theft protection instruction, the cellular phone automatically executing the received anti-theft protection instruction.

* * * * *